April 7, 1959     A. COYNE ET AL     2,880,612
MEASUREMENT OF PHYSICAL QUANTITIES WITH THE AID
OF APPARATUS WHICH CONVERTS THE SAID QUANTITIES
INTO VARIATIONS OF OSCILLATION FREQUENCY
Filed Nov. 1, 1955     2 Sheets-Sheet 1
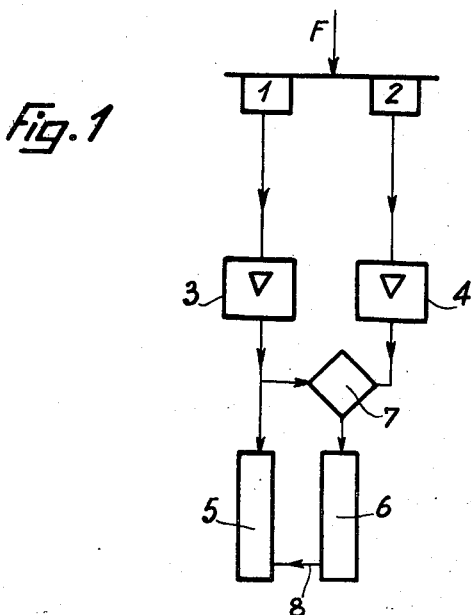
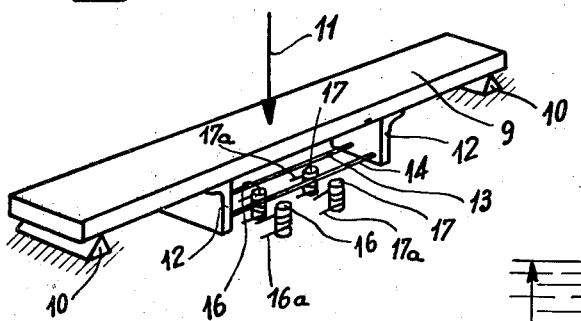
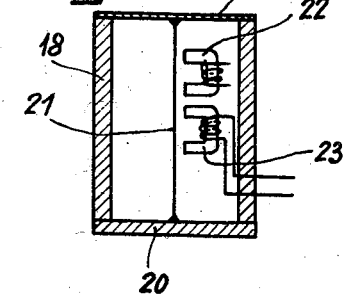
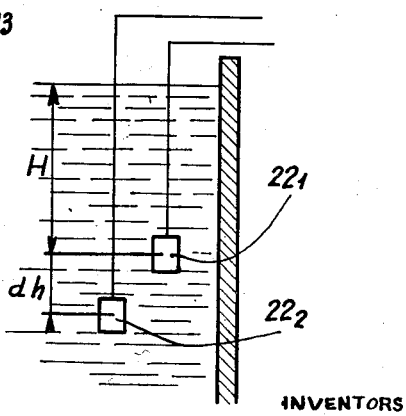
INVENTORS
ANDRE COYNE
JEAN BELLIER
By Watson, Cole, Grindle & Watson
ATTORNEYS

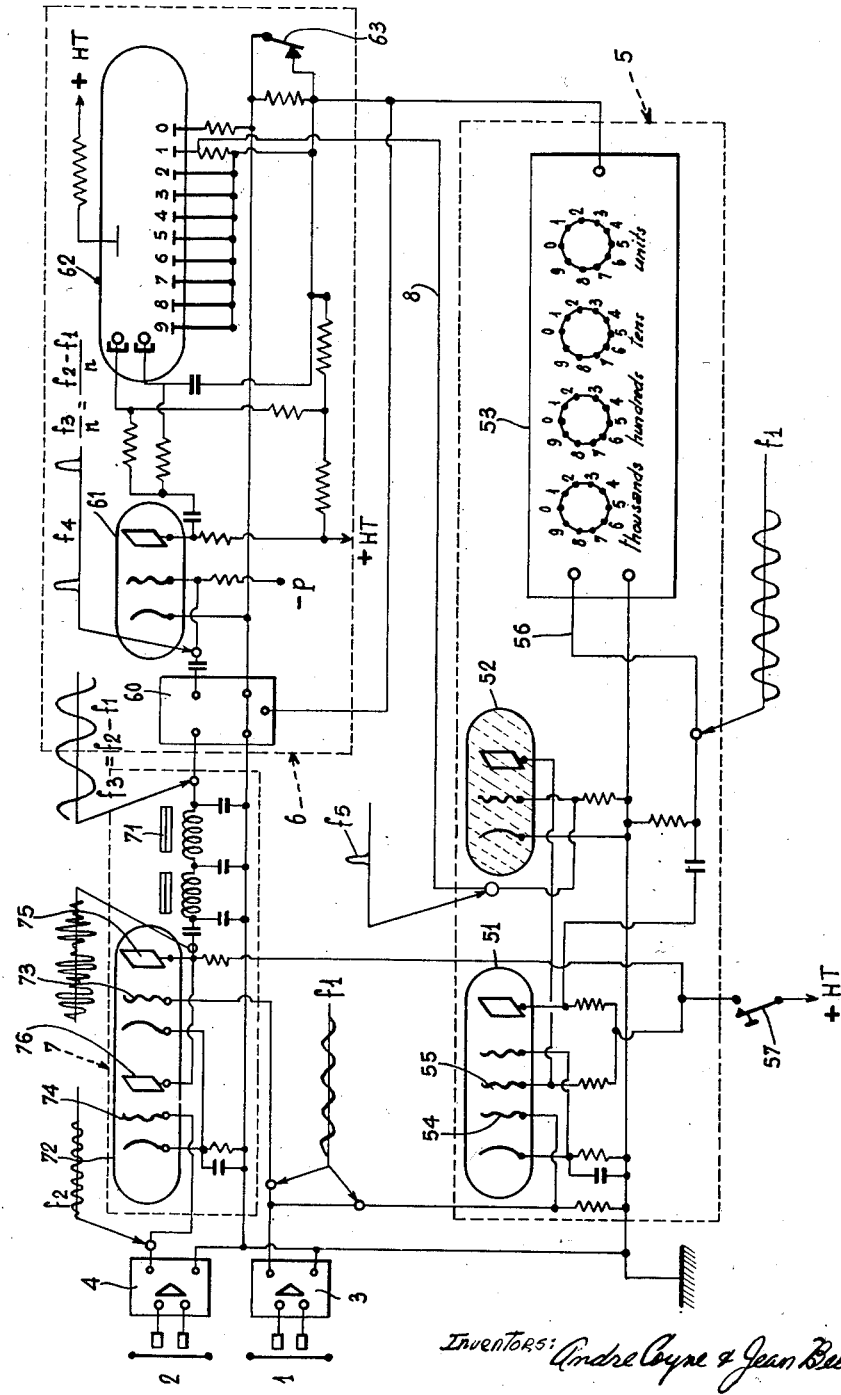

United States Patent Office 2,880,612
Patented Apr. 7, 1959

2,880,612

MEASUREMENT OF PHYSICAL QUANTITIES WITH THE AID OF APPARATUS WHICH CONVERTS THE SAID QUANTITIES INTO VARIATIONS OF OSCILLATION FREQUENCY

André Coyne and Jean Bellier, Paris, France

Application November 1, 1955, Serial No. 544,245

Claims priority, application France April 21, 1955

5 Claims. (Cl. 73—88.5)

Devices are already known which can be used to effect measurements and which comprise apparatuses which translate the variations of a physical quantity into variations of a frequency of oscillation or of vibraton. Such apparatuses may employ, for example, magneto-striction or piezo-electric effects.

In a more general way, a variation of a physical quantity, applied to an oscillating electric circuit, may be converted into a variation of the frequency of the said circuit.

A particular case of measuring apparatus which converts the variation of a physical quantity into a variation of frequency, is constituted by measuring apparatus of known kinds, called "vibrating cord" apparatus, in which the variation of the physical quantity measured causes a variation of the tension of the said cord and, in consequence, of the fundamental sound which it emits.

The drawback of measuring apparatus of this type is as follows: the law which relates the variation in the physical quantity to the variation in frequency is not in general linear. The direct measurement of the frequency of vibrations can thus not be related to a linear scale as a function of the variation in the quantity measured.

In particular, in the case of vibrating cords, the frequency of vibration $n$ is related to the tension $t$ of a cord of length L by the equation $$n = \frac{k\sqrt{t}}{L}$$

in which formula $k$ is a coefficient which depends on the elasticity and the specific weigh of the cord. As the cord is elastic, the tension $t$ varies proportionately to the relative elongation $$\frac{dL}{L}$$

of this cord, which depends on the deformation of the elastic support of the said cord to which the quantity to be measured is applied.

If thus the quantity to be measured causes relative elongations which are proportional to the variations of the said quantity, the frequency itself is proportional to the square root of the quantity to be measured. In other words, the variation of the quantity to be measured should be read on a scale having a parabolic variation as a function of the frequency which represents the said quantity.

The present invention has for its object to provide a proportional or linear relation between the quantity to be measured and the number of vibrations of an apparatus counted during a pre-determined time, provided that there exists, between the frequency furnished by the apparatus and the quantity to be measured, a law such that this frequency is proportional to any power of the said quantity.

The device for measuring in accordance with the invention consists in subjecting two identical measuring apparatus to the same quantity to be measured, the initial settings of the two apparatus being slightly different, which convert the variation of the said quantity into a variation in frequency of vibration, the said device operating to count the number of vibrations of one of the measuring apparatus during a time determined by a number, selected in advance, of beats at the differential frequency of the two apparatus.

If the law indicated above exists between the frequency of the apparatus and the quantity to be measured, the number of vibrations thus counted is proportional to the quantity to be measured, or in other words, a linear relation exists between this quantity and this number.

The duration of a beat is in fact inversely proportional to the difference in frequency between the two measuring apparatus. Now, a small difference in frequency has initially been provided on the two measuring apparatus and, since these two apparatus are identical, their variations in frequency will follow the same law as a function of the quantity measured. In the initial conditions of setting, the small difference in frequency can thus be regarded, in the case of one of these two apparatus, as the increase in frequency corresponding to a small increase in the quantity to be measured. In consequence, the difference of the frequencies of the apparatus varies as the product of this small given increase in the quantity to be measured and the first derivative of the law of variation.

In fact, if this initial difference is considered as infinitely small, the variable difference between the two frequencies is, in the mathematical sense of the term, the differential of the law of variation.

For each value of quantity measured, the time during which the vibrations are counted is thus inversely proportional to the value of the first derivative of the law of variation of the frequency as a function of the quantity measured, whilst the number of vibrations counted during this time is defined by that law itself.

In order that there may exist a linear relation between this number and this quantity, it is necessary and it will suffice that the law in question should be a function of the quantity to be measured such that the ratio of the said function to its first derivative (logarithmic derivative) is constant.

It is known that functions complying with this condition have the form $kx^m$, or in other words, that is to say it provides a linear relation between the quantity measured and the number of vibrations counted, every time the law of variation of the frequency of these vibrations is a function of any power whatever of the quantity to be measured.

A device employed in accordance with the invention should thus comprise means for counting the number of vibrations of one of the two apparatus and means for counting a previously selected number of beats between the two apparatus. These different means are preferably electronic. The vibrations of one of the apparatus, converted into electrical vibrations, are transmitted to a first electronic counter with progressive operation, whilst the vibrations of the two apparatus are simultaneously transferred to a mixer stage in which is generated the differential frequency of these vibrations, this differential frequency being transferred to a second electronic counter which is arranged to stop the first counter as soon as it arrives at a counted number previously determined.

As the two counters are simultaneously set in operation after a previously-chosen number has been registered in the second (a number of beats), when the second counter arrives at this number, the first registers a number proportional to the quantity measured. By a suitable adjustment of the initial conditions and of the number of beats, it can be arranged that the number indicated by the first counter shows directly, to the nearest decimal order, the value of the measured quantity.

In the remainder of the present description, the case will more particularly be dealt with of vibrating cord measuring apparatus, for which the law of variations of frequency is of the form $kx^{1/2}$, it being understood that the invention can be applied to any apparatus which is capable of converting any physical quantity into vibrations or oscillations following a law proportional to any power of the quantity measured.

The description which follows below with regard to the attached drawings (which are given by way of example only and not in any sense by way of limitation) will make it quite clear how the invention may be carried into effect, the special features which may be brought out, either in the drawings or in the text, being understood to form a part of the said invention.

Fig. 1 is a synoptic diagram of a measuring device in accordance with the invention and comprising two measuring apparatus supplying a variable frequency.

Fig. 2 is a simplified view in perspective of a group of two vibrating cord measuring apparatus together with one single member sensitive to the quantity to be measured.

Fig. 3 shows a cross-section of a pressure capsule with a vibrating cord.

Fig. 4 shows the application of capsules of the above type in a device in accordance with the invention for the measurement of the variable level of a liquid contained in a receptacle.

Fig. 5 is an electric network of a device in accordance with the invention.

In the diagram shown in Fig. 1 (see also Fig. 5), two apparatus 1 and 2, capable of translating a quantity to be measured into frequency are simultaneously subjected to that quantity, this having been diagrammatically shown by the arrow F.

The vibrations or oscillations of the apparatus 1 and 2 are directly obtained in the form of electric oscillations or are converted into electric oscillations by known means, for example with the aid of a microphonic device of any kind. The electric oscillations of the apparatus 1 and 2 are respectively transferred to the amplifiers 3 and 4 and are eventually converted into electric pulses in these amplifiers by cutting off the peaks. The pulses $f_1$ produced in the amplifier 3 are directly sent to a chain of electronic counters 5 which work progressively. The pulses $f_1$ and $f_2$ from the amplifiers 3 and 4 are both applied to a frequency-mixing stage 7 provided with a filter 71 by means of which the differential frequency $f_3$ of these pulses is extracted. This differential frequency is sent into a chain of electronic counters 6, in which has been registered a previously-selected number. An electrical connection 8 couples the chain 6 to the chain 5 so as to ensure the simultaneous operation of the two chains and the stoppage of the chain 5 when the chain 6 has reached the number registered.

Fig. 2 shows, mainly for the purpose of explanation, one of the very numerous possibilities of construction of the apparatus 1 and 2. The device illustrated in this figure is constituted by an elastic blade 9 resting on two supports 10. The quantity to be measured, which can be compared to a force or transformed into a force acting in the direction of the arrow 11, causes a variable bending of the blade 9. This blade carries, for example, on its lower face, two rigid parallel brackets 12 between which are stretched the two vibrating cords 13 and 14 formed by a single ferro-magnetic wire. These vibrating cords are initially stretched with slightly different degrees of tension so that they have at all times slightly different fundamental sound frequencies.

When the blade bends, the tension of the two cords simultaneously varies in the same way and the variation of their frequencies is a measure of the deformation of the blade, that is to say of the quantity 11. In the vicinity of each of the cords 13 and 14 is arranged a pair of electro-magnets 16 and 17, each of which has a winding 16a, 17a. One of these electro-magnets constitutes a microphonic device which is affected by the corresponding cord, whilst the second operates as a motor to maintain the vibration of the cord and to compensate for its natural damping. After the vibration has been started the maintaining current is the microphonic current of the associated electro-magnet suitably amplified and passed in phase to the driving electro-magnet.

It can be supposed that the device shown in Fig. 2 will constitute the upper part of the system shown in Fig. 1.

Let $a$ be the relative elongation $$\frac{dL}{L}$$

of the cords 13 and 14; it is proportional to the quantity 11. For one of the cords, 13 for example, the frequency $n_1$ may be written:

$$n_1 = C\sqrt{a+a_0}$$

where $a_0$ corresponds to the initial adjustment of the tension of the cord before any variation occurs in the tension of that cord, that is to say, in the case considered, any bending of the blade 9. In these conditions, the frequency $n_2$ of the other cord 14 will be:

$$n_2 = C\sqrt{a+a_0+da_0}$$

where $da_0$ corresponds to the difference in initial adjustment of the two cords.

In the system illustrated in Fig. 1, the frequency issuing from the mixer stage 7 is that of the differential beat between the frequencies $n_1$ and $n_2$, that is to say a frequency $$\Delta n = |n_1 - n_2|$$

or the difference in the absolute values of the frequencies $n_1$ and $n_2$.

To the extent to which $da_0$ may be considered as infinitely small as compared with $(a+a_0)$, $\Delta n$ varies as the differential of the frequency $n_1$ and thus it may be expressed as follows:

$$\Delta n = \frac{C}{2\sqrt{a+a_0}} da_0$$

It is this frequency $\Delta n$ which is sent into the counting chain 6, whilst the chain 5 receives the frequency $n_1$.

Let $N_2$ be the number registered a priori in the chain 6. The stopping of the chain 5 will thus be obtained at the end of a time $t$ such that:

$$N_2 = \Delta n t$$

During this time, the chain 5 has counted a number of oscillations $n_1$ such that:

$$N_1 = n_1 t$$

By eliminating the time $t$ between these last two equations, the relation between $N_1$ and $N_2$ is obtained as follows:

$$N_1 = \frac{n_1}{\Delta n} \cdot N_2$$

from which, by replacing $n_1$ and $\Delta n$ by their values:

$$N_1 = \frac{2(a+a_0)}{da_0} N_2 \qquad (1)$$

The number $N_1$ is thus in fact a linear function of $a$, that is to say of the relative elongation. In other words, the number $N_1$ of vibrations counted is truly a linear function of the quantity to be measured. It is thus possible to calibrate the impulse counter 5 in a linear manner, that is to say to read directly on this counter, at a coefficient of proportionality which may be of the form $10^p$, the value of the quantity to be measured.

The network of the above arrangement is shown in Figure 5 and the operation thereof will be explained with reference to this figure.

The amplifiers 3 and 4 are adjusted so that the amplitude of their output sinusoidal current $f_1$ and $f_2$ are substantially equal.

The mixing stage 7 comprises a double triode 72 arranged as a mixer tube: the signal $f_1$ and $f_2$ are simultaneously applied to the grids 73 and 74 of this tube and the plates 75 and 76 thereof are connected in parallel to a low-pass filter 6 at the outlet of which there is collected a sinusoidal current having a frequency $$f_3 = f_2 - f_1$$

which is lower than the cut-off frequency of the low-pass filter.

Thus for example:

$$f_2 = 10,200 \text{ Hz.}$$
$$f_1 = 9,000 \text{ Hz.}$$

therefore $$f_3 = 1,200 \text{ Hz.}$$

The low-pass filter 71 can be adjusted to cut off frequencies above 3000 Hz. thus allowing passage of $f_3$ and cutting off the components $f_1$ and $f_2$.

The sinusoidal current frequency $f_3$ issuing from the filter 71 is led to the input of the chain of counters 60 of conventional type giving output pulses. This chain of counters is used as a de-multiplying device and can comprise dekatron tubes. This chain supplies pulses $f_4$ at a frequency $$\frac{f_3}{n}$$

$n$ being the de-multiplying factor of the chain.

Thus if in the above numerical example, three decimal dekatrons are used, the input frequency $f_3=1200$ Hz. will correspond to an output frequency:

$$f_4 = \frac{f_3}{10 \times 10 \times 10} = \frac{1200}{1000} = 1.2 \text{ Hz.}$$

this corresponds to the generation of a pulse every 1/1.2 seconds.

The pulses $f_4$ issuing from 60 are applied to a triode 61 to be properly re-shaped and then transmitted to a dekatron tube 62 operating as a selector. A switch 63 ensures, when it is opened, the return to zero of every counter.

Assuming that the dekatron selector tube 62 has been returned to zero, as soon as a pulse reaches this tube, the latter will pass from zero to one which, with the arrangement illustrated in Figure 5, causes a positive pulse $f_5$ to be sent through the line 8.

This line leads to a gate (or electronic switch) constituted by a pentode 51 and a thyratron 52, this gate controlling the input of an electronic counter 53 as explained hereafter. Therefore a positive pulse transmitted through the line 8 closes the gate and stops the admission of the frequency $f_1$ into the counter 53.

The output of the amplifier 3 is connected on the one hand to the grid 73 of the mixer tube 72 as explained above and, on the other hand, to the control grid 54 of the pentode 51. The latter tube is arranged so that the thyratron 52 is connected in parallel with its screen grid 55. Therefore the pentode 51 operates normally provided thyratron 52 is off; on the contrary, the pentode will be blocked when the thyratron 52 is conductive since this results in a substantial decrease of the voltage of the screen grid 55. This assembly 51—52, therefore, constitutes a conventional and well known gate or electrical switch.

When the thyratron 52 is not conductive, that is to say when the gate is open, the frequency $f_1$ crosses the pentode 51 and enters, through the line 56, the conventional electronic counter 53.

A switch 57 connected to the voltage source allows starting. When this switch is open, the frequency $f_1$ cannot flow through 51 and into the counter 53, the thyratron 52 is cut off and the mixer tube 72 does not allow $f_2-f_1$ to pass; all the counters can then be returned to zero by momentarily opening the switch 63.

If the switch 57 is then closed, the current of frequency $f_1$ will cause progression of the counter 53 until a positive pulse arriving through the line 8 will render thyratron 52 conductive and close the gate 51—52; the counter 53 will then stop and a reading can be taken thereon, which will be the desired measurement as explained by the theory of the system set forth above. In order to obtain another reading, the following sequence of operations will be repeated: opening of 57, general return to zero by means of 63 which is opened and closed, closure of 57.

To sum up, the above described system operates as follows: after the counters have been returned to zero, a chain of counters is put into use for supplying a pulse after a delay which depends on a predetermined number of cycles of a current of frequency $f_3=f_2-f_1$, and simultaneously an electronic counter will reckon the number of cycles of the frequency $f_1$ received during this delay.

In a general way, the invention can be applied to all extensometers of the vibrating cord type which are capable, by a suitable arrangement, of measuring physical quantities such as accelerations, forces, pressures, temperatures, etc. which quantities can act by elastic deformation on the base length of these extensometers.

However, the invention has special advantages in the case of measurement of pressures and, in particular, of the measurements of level of receptacles containing liquids.

An extensometer apparatus for measurement of pressure may be constructed in the manner shown diagrammatically in Fig. 3. The fluid-tight and rigid casing 18 is closed at one side by an elastic member 19 to which is applied the pressure to be measured, and at the other side by a rigid base 20. A vibrating cord 21 is stretched between these two members and, as in the preceding case, it is arranged to influence and to be maintained in vibration by means of the electro-magnets 22 and 23.

To measure the level H of the receptacle shown in Fig. 4, for example the level of water in the reservoir of a barrage, with respect to a first apparatus $22_1$, there is arranged in the vicinity of the first apparatus an identical apparatus $22_2$ having a different initial setting. This difference in initial setting may also be obtained by the adjustment of the difference $dh$ of the depths of immersion of the two apparatus. There can thus be obtained a particularly sensitive adjustment of the initial difference in frequency between the two apparatus.

In Formula 1 which gives the value of the number $N_1$, there are three arbitrary parameters, namely: the initial tension (the term $a_0$) the difference in initial frequency ($da_0$) and the number of beats ($N_2$) which determine the time during which the measurement is effected. These parameters enable the amplitude of the measurement scale and this scale itself to be defined. In fact, the origin of the scale of measurement is given by:

$$N_0 = \frac{2a_0}{da_0} \cdot N_2$$

and the end of the scale (maximum value) by:

$$N_m = \frac{2(a_m + a_0)}{da_0} \cdot N_2$$

where $a_m$ is the maximum variation of elastic elongation. Finally, the unitary scale is given by $$\frac{N_m - N_0}{a_m}$$

or
$$\frac{2a_m}{da_0}N_2$$

In particular, if the counter 5 starts from the value $-N_0$ instead of zero, the scale of measurement starts from zero and the readings of measurement can in all cases be made directly. The number $N_0$ may furthermore be verified from time to time so as to check the aberration of the measuring device.

It will, of course, be understood that modifications may be made to the forms of embodiment which have just been described, in particular by the substitution of equivalent technical means, without thereby departing from the spirit or from the scope of the present invention.

What we claim is:

1. The combination with two apparatus designed for converting the magnitude of a physical factor applied thereto into electrical oscillations whose frequency varies as a known power of said magnitude, said apparatus being identical but differently pre-set whereby the frequencies produced thereby slightly differ upon application of the same magnitude thereto, mixing means connected to the apparatus for receiving said oscillations and generating a current having a frequency equal to the difference of the frequencies of said oscillations, counting means connected to said mixer for receiving said differential frequency and generating a signal after a predetermined number of cycles thereof, measuring means connected to one of said apparatus for receiving the electrical oscillations of said apparatus and measuring the number of cycles thereof, and switching means for stopping the operation of said latter measuring means upon receiving said signal.

2. The combination of claim 1 wherein the counting means comprises a chain of electronic counters.

3. The combination of claim 1 wherein the mixing means comprises an electronic tube and a low-pass filter at the output end thereof, said filter allowing passage of the differential frequency but preventing passage of the initial component frequencies.

4. The combination of claim 1 wherein each apparatus comprises a ferromagnetic vibrating cord, electromagnetic means for setting said cord in vibration, electromagnetic means for generating a current having a frequency equal to the vibration frequency of said cord, and means for varying the tension of said cord in accordance with the magnitude of the physical factor to be measured.

5. The combination of claim 4 wherein the two cords are identical but have a slightly different initial tension.

References Cited in the file of this patent

UNITED STATES PATENTS

| | | |
|---|---|---|
| 2,306,137 | Pabst et al. | Dec. 22, 1942 |
| 2,423,103 | Koechlin | July 1, 1947 |
| 2,447,817 | Rieber | Aug. 24, 1948 |
| 2,469,786 | Rieber | May 10, 1949 |
| 2,513,678 | Rieber | July 4, 1950 |
| 2,576,900 | Brockman | Nov. 27, 1951 |